(12) United States Patent
Cherukuri et al.

(10) Patent No.: US 6,732,209 B1
(45) Date of Patent: May 4, 2004

(54) DATA RATE DIVISION AMONG A PLURALITY OF INPUT QUEUES

(75) Inventors: Ravi K. Cherukuri, Pleasanton, CA (US); Arun Vaidyanathan, Fremont, CA (US); Viswesh Anathakrishnan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/536,885

(22) Filed: Mar. 28, 2000

(51) Int. Cl.[7] ............................................... G06F 13/38
(52) U.S. Cl. ...................... 710/240; 710/117; 710/244; 709/240; 370/412; 370/391
(58) Field of Search ................................ 710/240, 107, 710/117, 244; 370/402, 412, 523, 391, 355, 232; 707/9; 709/240; 714/117

(56) References Cited

U.S. PATENT DOCUMENTS

| | | | | |
|---|---|---|---|---|
| 5,241,632 A | * | 8/1993 | O'Connell et al. | 710/117 |
| 5,434,860 A | * | 7/1995 | Riddle | 370/523 |
| 5,448,701 A | * | 9/1995 | Metz et al. | 370/232 |
| 5,548,646 A | * | 8/1996 | Aziz et al. | 713/153 |
| 5,623,668 A | * | 4/1997 | Nieuwenhuizen | 714/34 |
| 5,689,500 A | * | 11/1997 | Chiussi et al. | 370/235 |
| 5,689,508 A | * | 11/1997 | Lyles | 709/240 |
| 5,732,078 A | * | 3/1998 | Arango | 370/391 |
| 5,748,629 A | * | 5/1998 | Caldara et al. | 370/389 |
| 5,859,980 A | * | 1/1999 | Kalkunte | 370/355 |
| 5,870,629 A | * | 2/1999 | Borden et al. | 370/412 |
| 5,884,027 A | * | 3/1999 | Garbus et al. | 370/402 |
| 5,938,749 A | * | 8/1999 | Rusu et al. | 710/117 |
| 5,953,335 A | * | 9/1999 | Erimli et al. | 370/390 |
| 6,021,442 A | * | 2/2000 | Ramanan et al. | 709/238 |
| 6,061,330 A | * | 5/2000 | Johansson | 370/229 |
| 6,073,132 A | * | 6/2000 | Gehman | 707/9 |
| 6,092,108 A | * | 7/2000 | DiPlacido et al. | 709/224 |
| 6,144,639 A | * | 11/2000 | Zhao et al. | 370/235 |
| 6,389,557 B1 | * | 5/2002 | Yu et al. | 710/244 |
| 6,424,624 B1 | * | 7/2002 | Galand et al. | 370/231 |
| 6,490,630 B1 | * | 12/2002 | Poon et al. | 709/235 |
| 6,496,935 B1 | * | 12/2002 | Fink et al. | 713/201 |
| 6,636,524 B1 | * | 10/2003 | Chen et al. | 370/418 |
| 6,657,962 B1 | * | 12/2003 | Barri et al. | 370/235 |

OTHER PUBLICATIONS

M. Morris Mano, Computer System Architecture, 1982, Prentice–Hall, Inc., 2nd Edition, pp. 434–443, 459–461.*
James L. Perterson, Abraham Silberschatz, Operating System Concept, 1985, Addison–Westley, inc., 2nd Edition, pp. 127–129.*

* cited by examiner

Primary Examiner—Xuan M. Thai
Assistant Examiner—Justin King
(74) Attorney, Agent, or Firm—Harrity & Snyder, LLP (57) ABSTRACT

An apparatus and method for distributing data transmission from a plurality of data input queues in a memory buffer to an output. The method includes associating a priority indicator with each data input queue, determining a priority indicator having a highest priority level among the plurality of priority indicators and selecting the data input queue associated with the priority indicator having the highest priority level to transmit to the output.

16 Claims, 5 Drawing Sheets

DATA RATE DIVISION AMONG A PLURALITY OF INPUT QUEUES

The present invention relates generally to computing systems and more specifically to methods and apparatus for routing data.

BACKGROUND

Routers are machines that facilitate the movement of data from a source to a destination in a reliable manner. Routers perform two fundamental functions, determine routing information for moving data packets along a route to a destination, and forward the data packets using the routing information to a next hop along the route toward the destination. The data packet forwarding process can include moving packets of data from a router input interface, through a switch fabric, to an appropriate router output interface, based on the routing information.

In some router implementations, a switch fabric includes a common memory buffer for storing the data portion of packets while the header portion is processed by routing software to determine a next hop toward the destination. Often, routers have a number of input interfaces receiving data at different rates and competing for the availability of a common output. In such devices, the memory buffer in the switch fabric is divided into a number of data input queues, each receiving data from a different input interface at a different rate.

When a number of input queues receiving data at different rates are vying for access to an output of limited bandwidth, it is important to properly manage each queue's ability to access and monopolize the output. If a input data queue in the memory buffer is not able to access the output frequently enough, the input data queue will fill, be unable to accept new data for forwarding, and a traffic pile-up will result in those segments of the network which are forwarding data to its associated input. Similarly, if an input data queue is permitted to access the output too frequently, the input data queue will under-utilize the buffering capability of the router, and over-utilize the output interface at the expense of the other data input queues.

What is needed is an efficient method for dividing output bandwidth among a number of data input queues receiving data from a number of input devices at different data rates, such that no one input queue under-utilizes or over-utilizes the output.

SUMMARY OF THE INVENTION

In one aspect, the invention comprises a method for dividing output bandwidth among a number of data input queues receiving data from a number of input devices at different data rates. In one aspect, the invention includes a method for dividing the bandwidth of an output network line interface among a number of data input queues receiving data from a number of input network line interfaces implementing different network services and receiving data at different rates.

The output bandwidth is divided by initially assigning a priority indicator to each input queue and periodically incrementing the assigned priority indicator by a programmable weight that is proportional to the sum of the weights of all of the queues. The input queue with the highest priority indicator is generally the queue selected to transmit data to the output. However, if the queue is delineated as being rate capped, the queue will not be selected to transmit to the output though it has the highest priority indicator. The queue may not be selected whenever its priority indicator has a value that is less than an initially assigned value. Finally, whenever a byte of data is transmitted out of a queue its priority indicator is decremented.

When a queue's priority indicator reaches a maximum allowable credit, the priority indicator is reset to the higher of the queue's initial credit allocation or the highest priority indicator associated with the other data input queues. Similarly, when a queue's priority indicator reaches a minimum allowable credit, it is reset to the lower of the queue's initial credit allocation or the lowest priority indicator associated with the other data input queues.

In another aspect, the invention provides a method for distributing data transmission from a plurality of data input queues in a memory buffer to an output. The method includes associating a priority indicator with each data input queue, determining a priority indicator having a highest priority level among the plurality of priority indicators and selecting the data input queue associated with the priority indicator having the highest priority level to transmit to the output.

Aspects of the invention can include one or more of the following features. The step of associating a priority indicator with a data input queue can include setting the priority indicator to an initial priority level. The method can include determining an increment level for a data input queue. The increment level can be proportional to the output bandwidth to which the data input queue requires access. The method can include periodically increasing the priority indicator associated with the data input queue by the increment level.

The step of increasing a priority indicator can include limiting the priority indicator to a value less than a maximum priority level. The step of limiting a priority indicator to a value less than a maximum priority level can include detecting an overflow condition indicating that a priority indicator has a value greater than the maximum priority level, selecting a highest priority level among the priority indicators which is less than the maximum priority level and setting the priority level of the overflowed priority indicator to the larger of the indicator's initial priority level and the maximum priority level.

The step of selecting a data input queue to transmit to the output can include detecting a transmit condition indicating data is being transmitted from the selected data input queue to the output and decrementing the data input queue's priority indicator by an amount of data transmitted. The step of decrementing a priority indicator can include limiting the priority indicator to a value greater than a minimum priority level. The step of limiting a priority indicator to a value greater than a minimum priority can include detecting an underflow condition indicating that a priority indicator has a value less than a minimum priority level, selecting a lowest priority level among the priority indicators which is greater than the minimum priority level and setting the priority level of the underflowed priority indicator to the smaller of the indicator's initial priority level and the minimum priority level.

The method can include associating a rate cap flag with a data input queue and setting the rate cap flag to indicate that the data input queue is to be rate-capped. The step of selecting a data input queue to access the output can include determining whether a rate cap flag associated with a selected data input queue is set, determining whether the priority indicator associated with the selected queue has a value less than the queue's initial priority level and selecting another data input queue to transmit to the output.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
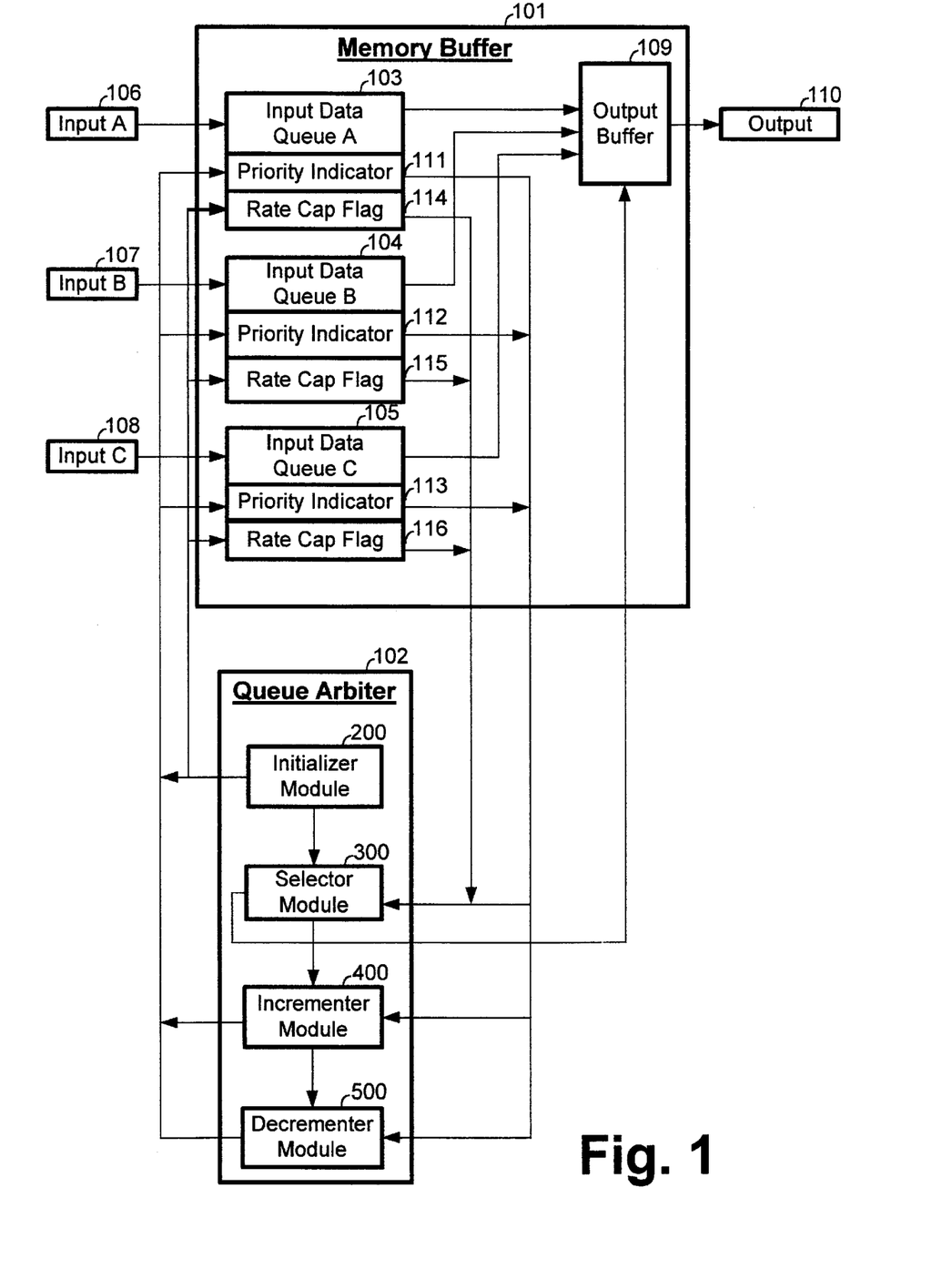
FIG. 1 is a block diagram of a queue arbitration apparatus for distributing data transmission from among a plurality of data input queues to an output queue.

FIG. 1 is a block diagram of a queue arbitration apparatus 100. Queue arbitration apparatus 100 includes a memory buffer 101 and a queue arbiter module 102. In one implementation, queue arbiter module 102 is a process running on a general-purpose central processing unit (CPU). In an alternative implementation, the queue arbiter module is a process running on an application specific integrated circuit (ASIC). Queue arbiter module 102 may also be implemented as a hardware module. Other implementations of the queue arbiter module are also possible, such as where queue arbiter module 102 is implemented in a combination of software and hardware.

Memory buffer 101 includes data input queues 103, 104, and 105 receiving data from inputs 106, 107, and 108; respectively. Memory buffer 101 also includes output buffer 109 transmitting data to output 110. Associated with each of the data input queues 103, 104 and 105 in buffer 101 are priority indicators 111, 112, and 113, and rate cap flags 114, 115, and 116, respectively. In one implementation, memory buffer 101 includes four data input queues receiving data from four inputs. Other implementations are also possible however, and the method of dividing data among the data input queues is not limited by, nor dependent upon, the number of such data input queues.

Queue arbiter 102 includes an initializer module 200, a selector module 300, an incrementer module 400, and a decrementer module 500. In one implementation, each of these modules is embodied as a process running on a general purpose CPU. In an alternative implementation, each module is embodied as a process running on an ASIC. Each module may also be embodied as a hardware module, or a combination of hardware and software. For example, one or more of the modules may be implemented in hardware while others are implemented in software running on a CPU or in software running on an ASIC.

Initializer module 200 associates priority indicators 111, 112, and 113, as well as rate cap flags 114, 115, and 116, respectively, with data input queues 103, 104 and 105.

Initializer module 200 initializes indicators 111, 112, and 113 and rate cap flags 114, 115, and 116. Selector module 300 selects one queue among data input queues 103, 104, and 105 to transmit data to output buffer 109, based upon information read from associated priority indicators 111, 112, and 113, and rate cap flags 114, 115, and 116. Incrementer module 400 increases queue priority by periodically incrementing priority indicators 111, 112, and 113 in accordance with programmable weights associated with each queue. Finally, decrementer module 500 decreases queue priority by decrementing priority indicators 111, 112, and 113 when data has been transferred out of input data queue's 103, 104, and 105, respectively.

Initializer Module

Figure 2:
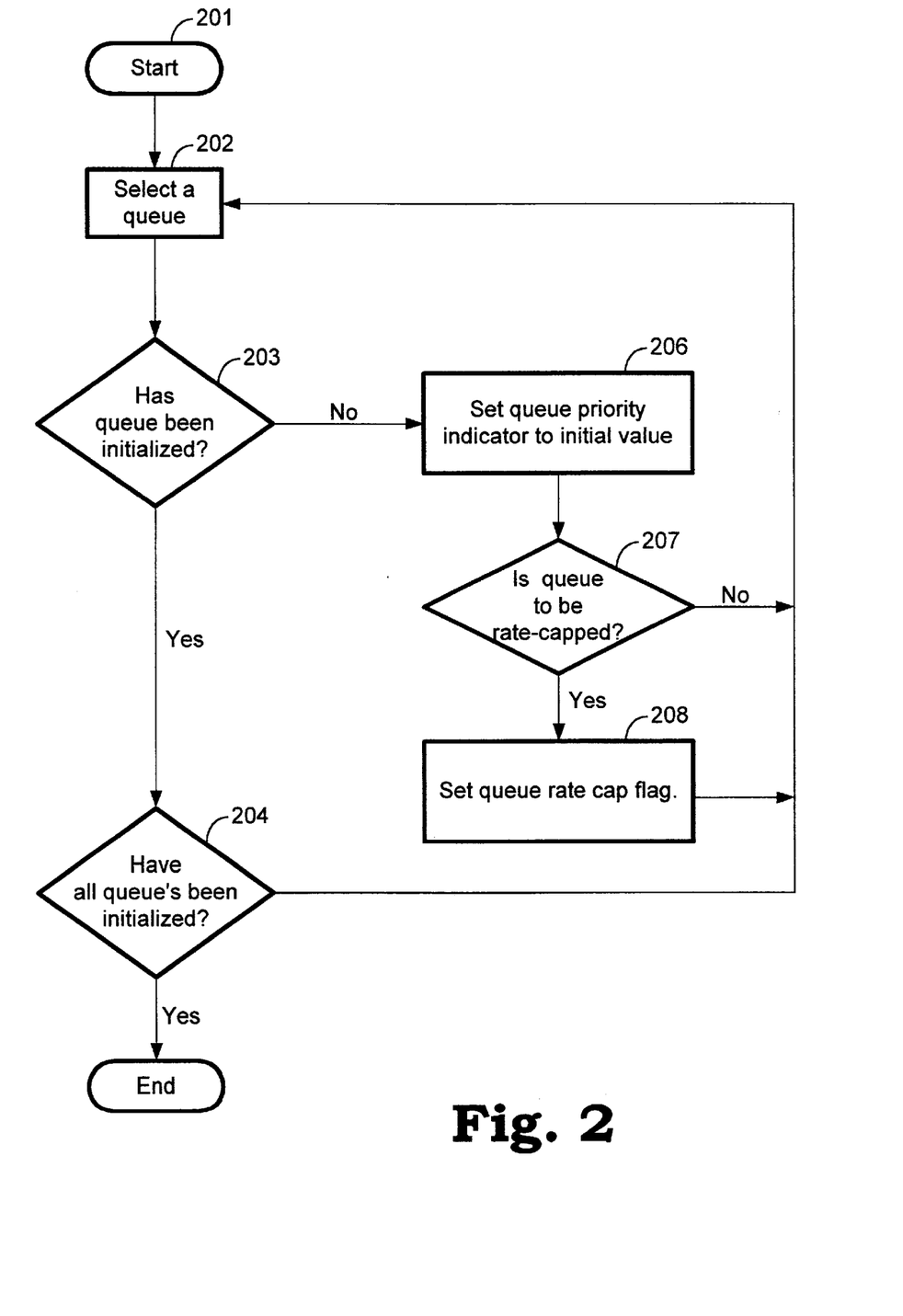
FIG. 2 is a flow chart showing the operation of the queue arbiter's initializer module.

FIG. 2 is a flow chart depicting the operation of initializer module 200 of FIG. 1. Referring now to FIGS. 1 and 2, initializer module 200 includes an entry or start point 201 where processing begins. The initializer module 200 selects a data input queue at step 202 and tests to see if it has already been initialized at step 203. If the data input queue has already been initialized, initializer module 200 checks to see if all of the other data input queues have been initialized at 204. If all data input queues have been initialized, initializer module 200 ends processing at step 205. If fewer than all data input queues have been initialized, initializer 200 selects another data input queue to initialize at step 202.

If a data input queue has not already been initialized, initializer module 200 initializes the data input queue by setting its associated priority indicator to an initial priority value at 206. In one implementation, each of the priority indicators associated with a data input queue are initialized by setting them to the same initial priority value. In alternative implementation, each queue has its priority indicator initialized by setting it to a unique initial priority value. In one implementation each priority indicator is represented by a 24 bit credit counter and is initialized to half its value, namely, 1000 0000 0000 0000 0000 0000 or 8,388,608. The bit widths of the priority indicators are variable depending on the data bandwidth and granularity of rate distribution across queues.

Once a data input queue's priority indicator has been initialized, initializer module 200 checks whether the data input queue is to be rate capped at step 207. If the queue is to be rate capped, initializer module 200 sets the queue's rate cap flag at 208 and proceeds to select another queue at step 202. If the queue is not to be rate capped, initializer 200 selects another data input queue at step 202.

Alternative implementations to initializer module 202 are also possible. In one such implementation, initializer module 200 includes a list of sequentially traversable data input queues. In this implementation, each data input queue is selected in turn, its corresponding priority indicator is set to an initial priority level, and a rate cap flag is set if the queue is to be rate capped.

Selector Module

Figure 3:
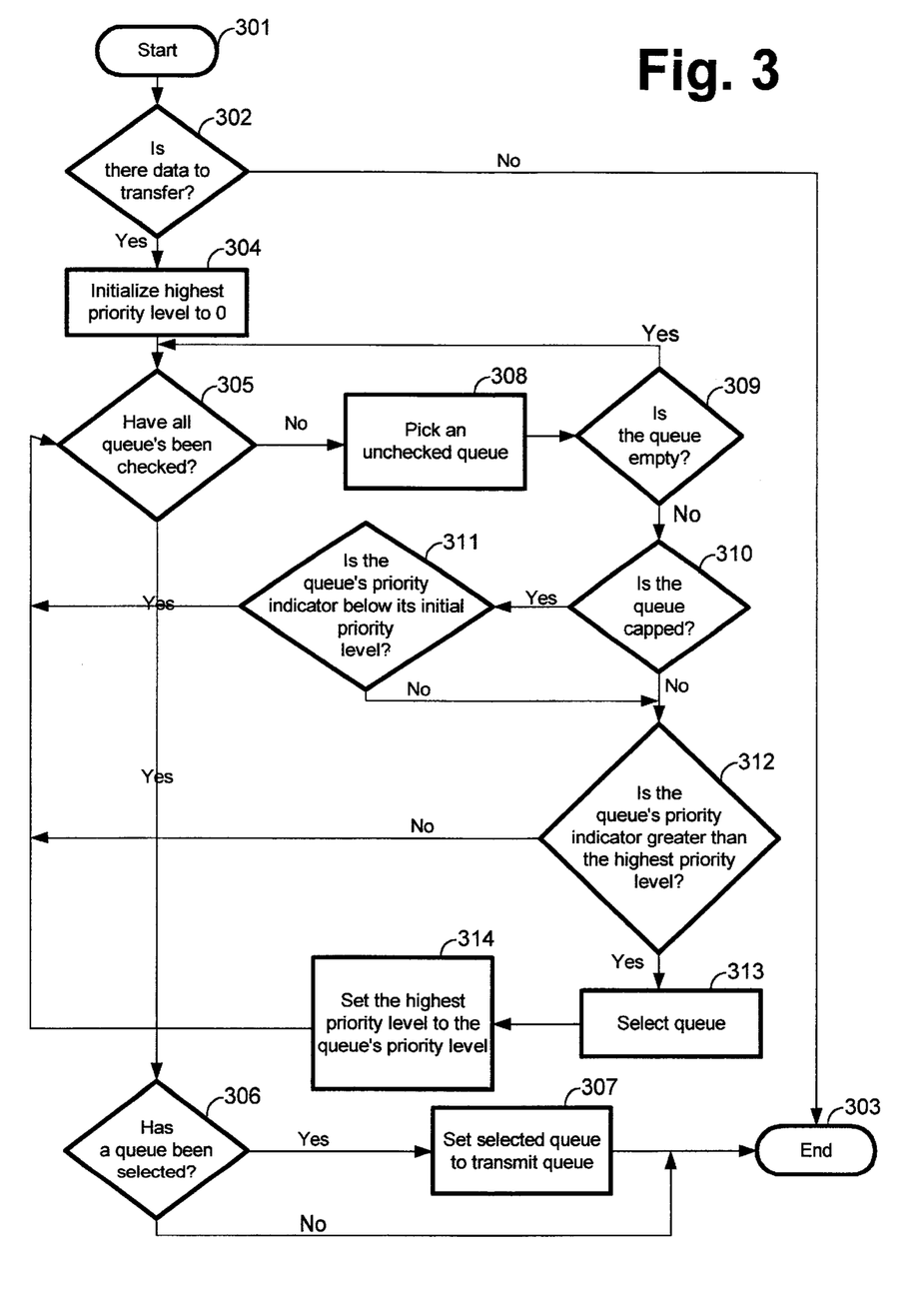
FIG. 3 is a flow chart showing the operation of the queue arbiter's selector module.

FIG. 3 is a flow chart showing the operation of selector module 300 of FIG. 1. Referring to FIGS. 1 and 3, selector module 300 selects which data input queue 103, 104, or 105 should have access to output buffer 109 (a transmit queue), based on priority indicators 111, 112, and 113, and rate cap flags 114, 115, and 116. Selector module 300 selects the data input queue with the highest priority indicator to be the transmit queue if that queue does not have its rate cap flag set. If the selector queue has its rate cap flag set, selector module 300 selects it to be the transmit queue if its priority indicator has a value greater than its initial priority level. However, if the data input queue has its rate cap flag set, and has a priority indicator that has a value less than its initial priority level, selector module 300 rejects the queue and selects a queue with a next highest priority indicator consistent with the previous rules.

A more detailed description of the process used by selector module 300, follows. Selector module 300 includes an entry or start point 301 where processing begins. Selector module 300 first checks if there is data resident in data input queues 103, 104, and 105 for transmission at step 302. If no data is available for transmission, selector module 300 ends processing at step 303. If one of data input queues 103, 104, or 105 includes data, selector module 300 initializes a highest priority level counter to a value of zero at step 304.

Selector module 300 then checks whether all data input queues have been previously checked to see which queue has the highest service priority at step 305. Initially, none of the data input queues will have been checked, and selector module 300 picks data input queues 103, 104 or 105 at step 308 and determines whether it has data at step 309. If the queue does not have data, selector module 300 rejects the queue and decides whether to pick another queue by checking whether all other data input queues have been checked at step 305. In an alternative implementation, selector module 300 includes a sequential list of data input queues and will cycle through the list, checking in turn data input queues 103, 104, and 105 for data to transmit at step 309.

If any queue 103, 104, or 105 has data to transmit at step 309, selector module 300 determines if the queue is rate capped at step 310 by checking its association rate cap flag 114, 115, or 116, respectively. If at step 310 the queue is rate capped, selector module 300 checks its priority indicator 111, 112, or 113 at step 311 to determine if the indicator has a value that is less than its initial priority value. If the queue's priority indicator has a value which is less than its initial priority value, selector module 300 rejects the queue and decides whether to check another queue by checking whether all other data input queues have been checked at step 305.

If selector module 300 determines, at step 310, that a queue is not rate capped, or at step 311 that a queue is rate capped but has a priority indicator with a value which is greater than its initial priority value, selector module 300 check's the queue's priority indicator at step 312 to see if the priority indicator has a value which is greater than the value of highest priority level counter. If the queue's priority indicator does not have a value which is greater than the value of highest priority level counter, selector module 300 rejects the queue and decides whether to check another queue by checking whether all other data input queues have been checked at step 305.

If at step 312 selector module 300 determines that a queue's priority indicator has a value which is greater than the value of the highest priority level counter, selector module 300 selects the queue at step 313, sets the highest priority level counter to the value of the queue's priority indicator at step 314, and decides whether to check another queue by checking whether all other data input queues have been checked at step 305.

Eventually, at step 305, all data input queues 103, 104, and 105 will have been checked. Selector module 300 then checks at step 306 whether a data queue has been selected in step 313. If a data input queue has been selected at step 313, selector module 300 sets the selected data input queue to be the transmit queue at step 307 and ends processing at step 303. If a data input queue has not been selected at step 313, selector module 300 does not reset the transmit queue and ends processing at step 303.

Alternative-implementations of the foregoing selection method are possible. For example, the foregoing has described an implementation in which selector module 300 checks whether the value of a priority indicator is greater than the value of a highest priority level counter. In an alternative implementation, selector module checks whether the value of the priority indicator is greater than or equal to the value of the highest priority level counter. In an alternative, negative logic implementation, selector module 300 selects the queue with the lowest priority indicator as the queue with the highest priority level.

Incrementer Module

Figure 4:
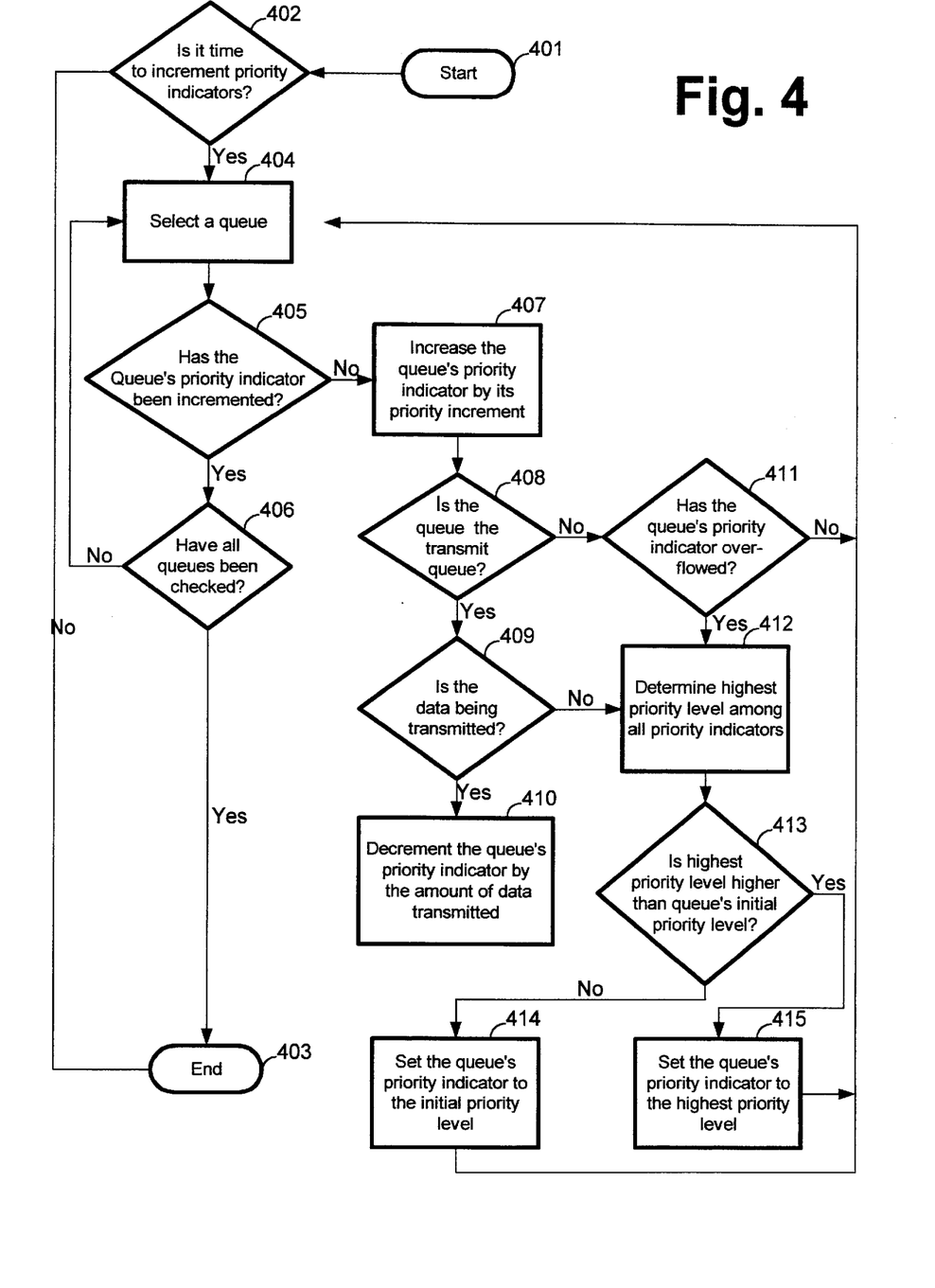
FIG. 4 is a flow chart showing the operation of the queue arbiter's incrementer module.

FIG. 4 is a flow chart showing the operation of incrementer module 400 of FIG. 1. Referring now to FIGS. 1–4, incrementer, module 400 periodically increases the priority level of data input queues 103, 104, and 105 by incrementing their associated priority indicators 111, 112, and 113 respectively. In one implementation, incrementer module 400 limits the priority indicator to having a value less than a maximum priority value. At the same time, incrementer module 400 checks whether the priority indicator being incremented is associated with a transmit queue which is transmitting data, and if so, decrements the priority indicator by the amount of data transmitted from the queue.

In one implementation, depicted in FIG. 4, incrementer module 400 periodically increments priority indicators 111, 112, and 113 at the same time by a different previously programmed increment amount (i.e., programmable weights associated with each queue). The increment amounts for priority indicators 111, 112, and 113 reflect the proportion of the output bandwidth to which data input queues 103, 104 and 105 require access, respectively. For example, where data inputs 103, 104 and 105 require 20%, 30%, and 50% of the output bandwidth, incrementer module 400 respectively periodically increments priority indicators 111, 112, and 113 by 20, 30, and 50 every 100 cycles of the transmit clock. In an alternative implementation, incrementer module 400 increments priority indicators 111, 112, and 113 by 2, 3, and 5 counts for every 10 cycles of the transmit clock. Still other implementations are possible.

In another alternative implementation, incrementer module 400 increments priority indicators 111, 112, and 113 at different times by the same amount, such that the priority indicator corresponding to the input requiring more access to the output bandwidth is incremented more frequently. Referring to the previous example where data input queues 103, 104, and 105 required access to 20%, 30% and 50% of the output bandwidth respectively, incrementer module 400 may increment priority indicator 111 by 3 units every 15 clock cycles, priority indicator 112 by 3 units every 10 clock cycles, and priority indicator 113 by 3 units every 6 cycles.

FIG. 4 shows a process executed by an incrementer module 400 for periodically increments all of the priority indicators by a different amount at the same time, as previously mentioned. Incrementer module 400 begins processing at step 401 by checking to see if it is time to increment priority indicators 111, 112, and 113 at step 402. If it is not time to increment the priority indicators, incrementer module 400 ends processing at step 403.

If incrementer module 400 determines at step 402 that it is time to increment the priority indicators, it selects one of data input queues 103, 104, or 105 at step 404 and checks whether its associated priority indicator 111, 112, or 113 has already been incremented at step 405. If the selected queue's associated priority indicator has already been incremented, incrementer module 400 checks whether all of queues 103, 104, and 105 have had their associated priority indicators incremented at step 406. If fewer than all of queues 103, 104 and 105 have had their associated priority indicators incremented, incrementer module 400 selects a new queue at step 404. If all of queue's 103, 104, and 105 have had their associated priority indicators incremented, incrementer module 400 stops processing at step 403.

Alternative implementations to the process described above are also possible. In one such implementation, incrementer module 400 includes a list of sequentially traversable data input queues. In this implementation, each data input queue is selected in turn and its associated priority indicator is incremented by the appropriate amount.

When incrementer module 400 determines that a selected queue's associated priority indicator has not been incremented at step 405, it increments the queue's priority indicator at step 407 by the queue's priority increment amount. Incrementer module 400 then determines in step 408 if the selected queue is the transmit queue selected by selector module 300. If the selected queue is not the transmit queue, incrementer module 400 proceeds to check whether the queue's priority indicator has overflowed at step 411. If the selected queue is the transmit queue, incrementer module 400 checks whether the queue has transmitted data during the current clock cycle at step 409. If the selected queue has not transmitted data, incrementer module 400 again proceeds to check whether the queue's priority indicator has overflowed at step 411. If the selected queue has transmitted data, incrementer module 400 decrements the queue's priority indicator by the amount of data transmitted at step 410, then proceeds to check whether the priority indicator has overflowed at step 411.

At step 411, incrementer module 400 determines whether the priority indicator associated with the selected queue has overflowed. In one implementation, an indicator overflows when it has a value that is equal to a maximum priority level.

In another implementation, an indicator overflows when it has a value that is greater than a maximum priority level. In one implementation, the maximum priority level is 1111 1111 1111 1111 1111 1111 or 16,777,215. If the priority indicator has not overflowed, incrementer module 400 finishes processing the selected queue and proceeds to select a new queue at step 404.

If incrementer module 400 determines that the priority indicator of the selected queue has overflowed at step 411, the incrementer module 400 determines a highest priority level among all priority indicators that have not overflowed at step 412. Incrementer module 400 next determines whether the highest priority level is greater than the overflowed priority indicator's initial priority level at step 413. If the highest priority level is greater than the overflowed priority indicator's initial priority level, incrementer module 400 sets the value of the overflowed priority indicator to the highest priority level at step 415, and proceeds to select a new queue for processing at step 404. If the highest priority level is less than the overflowed priority indicator's initial priority level, incrementer module 400 sets the value of the overflowed priority indicator to its initial priority level at step 414, then proceeds to select a new queue for processing at step 404.

Eventually, incrementer module 400 increments all priority indicators 111, 112, and 113 associated with data input queues 103, 104, and 105 and selects a queue at step 404, determines it has already been incremented at step 405, determines that all queues have been incremented at step 406, and ends processing at step 403.

In an alternative implementation, incrementer module 400 loops through data input queues 103, 104 and 105, increments priority indicators 111, 112, and 113 by their priority increments, determines a highest priority level from a priority indicator which has not overflowed, and decrements the priority indicator of the transmit queue by the amount of data transmitted. Incrementer module 400 then loops through data input queues 103, 104, and 105 a second time, checks priority indicators 111, 112, and 113 for overflow, and sets overflowed priority indicators to their initial priority levels or to the highest priority level determined in the first loop as previously described in steps 413 through 415.

Decrementer Module

Figure 5:
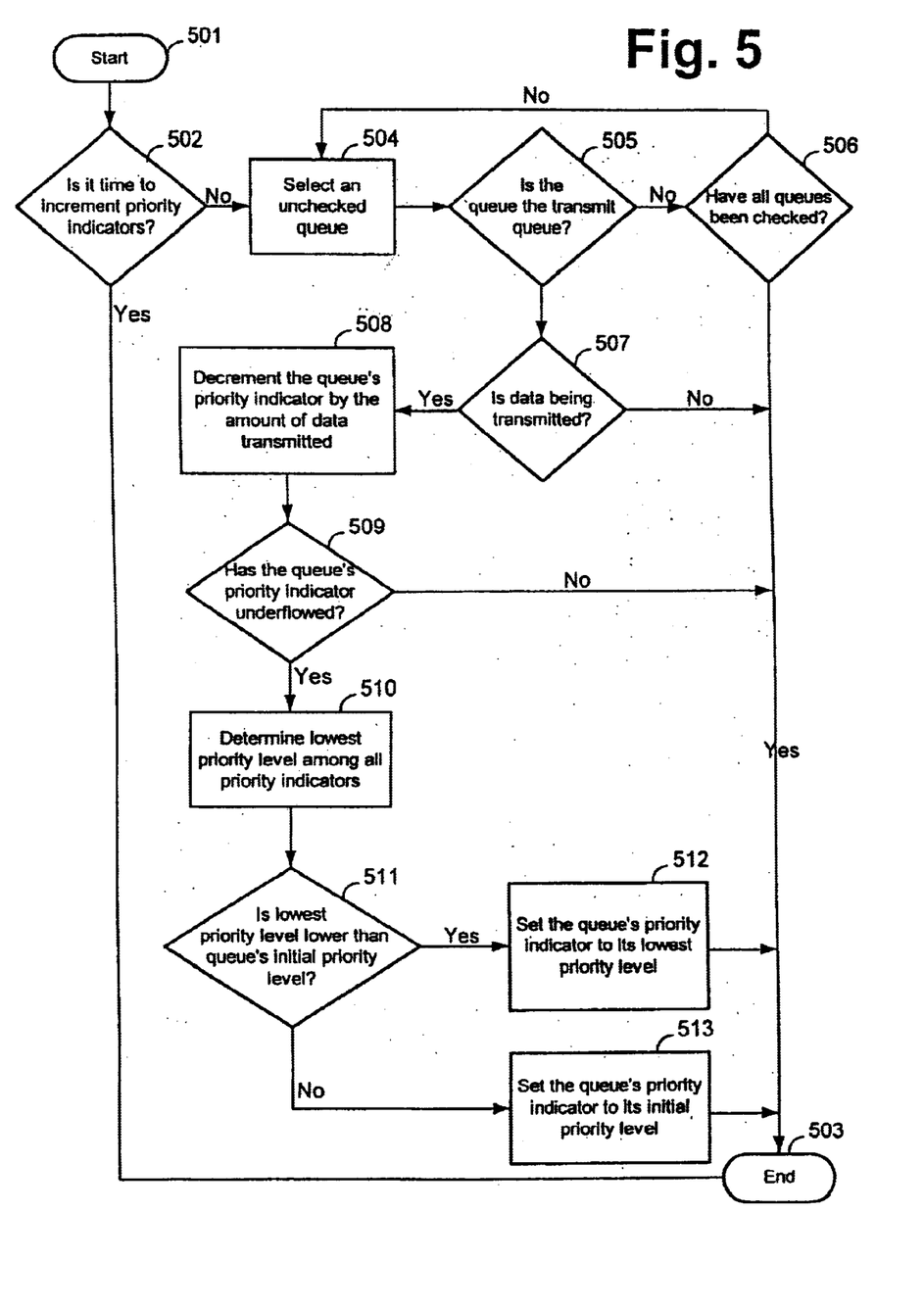
FIG. 5 is a flow chart showing a functional description of the queue arbiter's decrementer module.

FIG. 5 is a flow chart showing the operation of decrementer module 500 of FIG. 1. Referring to FIGS. 1 and 5, decrementer module 500 decreases the priority level of the data input queue selected by selector module 300 to be the transmit queue, whenever that queue has transmitted data during the current clock cycle to output buffer 109. Decrementer module 500 decrements the priority indicator associated with the transmit queue by the amount of data transmitted. In one implementation, decrementer module 500 limits priority indicators to having a value that is greater than a minimum priority value. In one implementation, the minimum priority value is 0.

Decrementer module 500 begins processing at step 501 by checking to see if it is time to increment priority indicators 111, 112, and 113 at step 502. If is time to increment the priority indicators, decrementer module 500 ends processing at step 503. When it is time to increment the priority indicators, incrementer module 400 correctly decrements the priority indicator associated with the data input queue that has transmitted data at step 411 as previously described. In an alternative implementation, decrementer module 500 decrements the priority indicator associated with the transmit data input queue irrespective of whether it is time to increment the priority indicators. In such system, incrementer module 400 never checks whether the selected queue is the transmit queue at step 408, but instead proceeds directly from incrementing a priority indicator at step 407 to determining whether the indicator has overflowed at step 411.

If decrementer module 500 determines at step 502 that it is not time to increment the priority indicators, selects one of data input queues 103, 104, or 105 at step 504 and determines whether the selected queue is the transmit queue selected by selector module 300 at step 505. If the selected queue is not the transmit queue, decrementer module 500 checks whether all of queues 103, 104, and 105 have been checked at step 506. If fewer than all of the queues have been checked, decrementer module 500 selects a new queue at step 504. If all of queues 103, 104, and 105 have been checked at step 506, decrementer module 500 stops processing at step 503.

Alternative implementations to the process described above are also possible. In one such implementation, decrementer module 500 includes a list of sequentially traversable data input queues. In this implementation, each data input queue is selected in turn at step 504 and checked to see if it is the transmit queue at step 505. Once the transmit queue is found, decrementer module 500 proceeds to step 507 to determine if data is to be transmitted from the queue during the current clock cycle.

When decrementer module 500 determines that a selected queue is the transmit queue at step 505, then the decrementer module 500 determines if the queue has transmitted data during the current clock cycle at 507. If the selected queue has not transmitted data, decrementer module 500 finishes processing at step 503. If the selected queue has transmitted data, decrementer module 500 decrements the queue's priority indicator by the amount of data transmitted at step 508, then checks whether the priority indicator associated with the transmit queue has underflowed at 509. In one implementation, an indicator underflows when it has a value that is equal to a minimum priority level. In another implementation, an indicator underflows when it has a value which is less than a minimum priority level. In one implementation, the minimum priority level is zero. If the priority indicator has not underflowed, decrementer module 500 finishes processing at step 503.

If decrementer module 500 determines that the priority indicator associated with the transmit queue has underflowed at step 509, it determines a lowest priority level among all priority indicators which have not underflowed at step 510. Decrementer module 500 then determines whether the lowest priority level is less than the underflowed priority indicator's initial priority level at step 511. If the lowest priority level is less than the underflowed priority indicator's initial priority level, decrementer module 500 sets the value of the underflowed priority indicator to the lowest priority level at step 512 and finishes processing at step 503. If the lowest priority level is greater than the underflowed priority indicator's initial priority level, decrementer module 500 sets the value of the underflowed priority indicator to its initial priority level at step 513, and finishes processing at step 503.

The present invention has been described in terms of specific implementations, which are illustrative of the invention only, and not to be construed as limiting. Other implementations are equally within the scope of the following claims.

In particular, the described method can be implemented using negative logic. In such an implementation, incrementer module 400 decrements priority indicators from a low priority/high indicator value state, to a high priority/low indicator value state, decrementer module 500 increments priority indicators from a high priority/low indicator value state to a low priority/high indicator value state, and selector module 300 selects the transmit queue to be the data input queue with the associated priority indicator which has the highest priority/lowest priority indicator value.

In particular, the system does not require that the components in queue arbitration apparatus (memory buffer 101, queue arbiter 102 and output buffer 109 of FIG. 1) operate from the same clock as the output module (output 110 of FIG. 1). In such an implementation, any disparity between clocks can be accommodated in the increment logic where the increment period can be calculated using the "output" clock. These and other implementations are within the scope of the claimed invention.

What is claimed is:

1. A method for distributing data transmission from a plurality of data input queues in a memory buffer to an output, said method comprising:
    associating a priority indicator with each data input queue in the memory buffer;
    determining a respective increment level for each of the plurality of data input queues in the memory buffer, the respective increment levels being proportional to respective desired bandwidths for the plurality of data input queues;
    periodically increasing the respective priority indicators associated with the plurality of data input queues by the respective increment levels;
    determining a priority indicator having a highest priority level among the plurality of priority indicators; and
    selecting the data input queue associated with the priority indicator having the highest priority level to transmit to the output, including:
    detecting a transmit condition indicating data is being transmitted from the selected data input queue to the output, and
    decrementing the data input queue's priority indicator by an amount of data transmitted.

2. The method of claim 1, wherein the step of associating a priority indicator with a data input queue further comprises:
    setting the priority indicator to an initial priority level.

3. The method of claim 1, wherein the step of periodically increasing the priority indicators further comprises:
    limiting the respective priority indicators to a value less than a maximum priority level.

4. The method of claim 3, wherein the step of limiting the respective priority indicators to a value less than a maximum priority level, further comprises,
    detecting an overflow condition indicating that an overflowed priority indicator among the priority indicators has a value greater than the maximum priority level;
    selecting a highest priority level among the priority indicators which is less than the maximum priority level; and
    setting the priority level of the overflowed priority indicator to the larger of the indicator's initial priority level and the highest priority level.

5. The method of claim 1, wherein the step of decrementing the data input queue's priority indicator, further comprises:
    limiting the data input queue's priority indicator to a value greater than a minimum priority level.

6. The method of claim 5, wherein the step of limiting the data input queue's priority indicator to a value greater than a minimum priority level comprises:
    detecting an underflow condition indicating that an underflowed priority indicator among the priority indicators has a value less than a minimum priority level;
    selecting a lowest priority level among the priority indicators which is greater than the minimum priority level; and
    setting the priority level of the underflowed priority indicator to the smaller of the indicator's initial priority level and the lowest priority level.

7. The method of claim 1, further comprising:
    associating a rate cap flag with a data input queue; and
    setting the rate cap flag to indicate that the data input queue is to be rate-capped.

8. The method of claim 7, wherein the step of selecting the data input queue associated with the priority indicator having the highest priority level further comprises:
    determining whether the rate cap flag associated with a selected data input queue is set;
    determining whether the priority indicator having the highest priority level and associated with the selected queue has a value less than the queue's initial priority level; and
    selecting another data input queue to transmit to the output.

9. A network device, comprising:
    a memory buffer including a plurality of input queues, each of the plurality of input queues having an associated priority value and a rate cap indicator; and
    a queue arbiter configured to determine which input queue among the plurality of input queues will send data to an output, the queue arbiter including:
        an incrementor module configured to periodically increment respective priority values associated with the plurality of input queues according to respective weights associated with the plurality of input queues,
        a selector module configured to select one of the plurality of input queues to send data to the output based on the priority values and the rate cap indicators associated with the plurality of input queues, and a decrementor module configured to decrement the priority value of the one input queue that sent data in proportion to an amount of data sent.

10. The network device of claim 9, wherein the incrementor module is further configured to periodically increment the priority value associated with a given one of the input queues in proportion to a ratio of the weight associated with the given input queue to a total weight associated with the plurality of input queues.

11. The network device of claim 9, wherein the selector module is further configured to select the input queue whose priority value is highest if the associated rate cap indicator indicates that the input queue does not have a rate cap, and wherein the selector module is still further configured to select the input queue whose priority value is second highest if the input queue associated with the highest priority value has a rate cap and the highest priority value does not exceed a rate cap threshold.

12. A method of selecting one input queue among a plurality of input queues in a memory buffer to send data to an output, comprising:

assigning a respective weight to each of the plurality of input queues in the memory buffer;

dynamically updating respective priority indicator values associated with respective ones of the plurality of input queues in proportion to the respectively assigned weights;

determining a respective increment level for each of the plurality of input queues in the memory buffer, the respective increment levels being proportional to respective output bandwidths associated with the plurality of input queues;

selecting a first one of the input queues whose associated priority value is highest if the first input queue is not rate capped or if the associated highest priority value exceeds a rate cap threshold; and selecting among other ones of the input queues than the first input queue if the first input queue is rate capped and the associated highest priority value does not exceed the rate cap threshold.

13. The method of claim 12, further comprising:

sending data from the selected input queue to the output.

14. The method of claim 13, further comprising:

decrementing the priority value of the selected input queue in proportion to an amount of data sent to the output.

15. The method of claim 12, wherein the selecting among other ones of the input queues includes:

selecting a second one of the input queues whose associated priority value is second highest if the second input queue is not rate capped or if the associated second highest priority value exceeds the rate cap threshold.

16. The method of claim 12, wherein the rate cap threshold is identical to an initial priority indicator value associated with at least one of the plurality of input queues.

* * * * *